United States Patent
Erlenkoetter et al.

(10) Patent No.: US 6,253,254 B1
(45) Date of Patent: *Jun. 26, 2001

(54) HYPER MEDIA OBJECT MANAGEMENT

(76) Inventors: Ansgar Erlenkoetter, Auf Der Heide 44, Neu-Anspach (DE), 61267; Jeroen Peter De Borst, Alte Mauergasse 5, Bad Homberg (DE), 61348; Peter Douglas Bonham, Am Alten Bach 19, Bad Homberg (DE), 61352

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/678,680

(22) Filed: Jul. 11, 1996

(51) Int. Cl.⁷ .................................................. G06F 17/30
(52) U.S. Cl. ......................... 709/316; 709/217; 707/104; 707/10
(58) Field of Search ..................... 395/680, 200.3, 395/200.5; 345/335; 709/300, 217, 218, 219; 707/10

(56) References Cited

U.S. PATENT DOCUMENTS

| | | | | |
|---|---|---|---|---|
| 5,204,947 | * | 4/1993 | Bernstein ........................ | 345/357 |
| 5,692,180 | * | 11/1997 | Lee ................................. | 707/10 |
| 5,701,451 | * | 12/1997 | Rogers et al. .................. | 707/4 |
| 5,732,219 | * | 3/1998 | Blumer et al. ................ | 709/200 |
| 5,742,762 | * | 4/1998 | Scholl ............................ | 395/200.3 |
| 5,748,186 | * | 5/1998 | Raman .......................... | 345/302 |
| 5,761,656 | * | 6/1998 | Ben-Shachar .................. | 345/335 |
| 5,842,219 | * | 11/1998 | High, Jr. et al. ............... | 707/103 |
| 5,860,010 | * | 1/1999 | Attal .............................. | 395/706 |
| 6,163,776 | * | 12/2000 | Perwal .......................... | 707/4 |

OTHER PUBLICATIONS

Article by V. Jagannathan et al., entitled "Collaborative Infrastructures Using the WWW and CORBA–Based Environments" published by Proceedings of Wet Ice on Jun. 19, 1996 pp. 292–297.

* cited by examiner

Primary Examiner—Dung C. Dinh

(57) ABSTRACT

A method and apparatus that uses a hypermedia approach to managing distributed objects. A first embodiment of the present invention uses the World Wide Web hypermedia system. A user initializes browser software that allows the user to browse and change various attributes of objects in the system. The browser communicates with a server that includes an http adapter and a gateway. The gateway can access objects in the system and generate HTML code in accordance with the objects. One embodiment of the present invention uses hierarchical tree-oriented objects. These objects are "self-describing" (also called "introspective"). The server queries the objects in response to the queries from the browser and each queried object responds with information about itself. In another preferred embodiment, the server initiates queries of the objects and retains this information for use in responding to later queries from the browser.

10 Claims, 14 Drawing Sheets hamset.html

```
1  |<HTML>
2  |<HEAD>
3  |<TITLE>Alter Configuration of Hypermedia Adaptor
   |NSK@TCP:168.87.28.7/8062:HAM </TITLE>
4  |<BASE HREF="http://mad.hprc.tandem.com:8080/ham/set/TCP%3a168.87.28.
   |7%2 f8062%3aHAM%2fHyperMedia%20Adapter%20NSK%2fConfiguration/">
5  |</HEAD>
6  |
7  |<BODY BACKGROUND="/icons/icstgry.gif">
8  |<H2>
9  |<IMG ALT=" " SRC="/icons/pccnfig.gif">
10 |Alter Configuration</H2>
11 |<H3>of HyperMedia Adapter NSK</H3>
12 |<P><CENTER><IMG SRC="/icons/pcbrblu.gif"></CENTER><P>
13 |<FORM METHOD=POST ACTION="http://mad.hprc.tandem.com:8080/ham/
   |cset/TCP%3a168.87.28.7%2f8062%3aHAM%2fHyperMedia%20Adapter
   |%20NSK%2fConfiguration/">
14 |<TABLE>
15 |<P><CAPTION><STRONG><FONT SIZE=4>Configuration</FONT>
   |</STRONG></CAPTION>
```

620 {
```
16 |<TR><TH ALIGN=LEFT><P>Status:</TH>
17 |<TD ALIGN=LEFT>Running</TD>
18 |<TR VALIGN=BASELINE>
```

622 {
```
19 |<TH ALIGN="LEFT"><P>Change Status to: </TH><TD>
20 |<SELECT NAME="Change Status to">
21 |<OPTION SELECTED> Running
22 |<OPTION> Suspended
23 |<OPTION> Aborted
24 |<OPTION> Stopped
25 |</SELECT>
26 |</TD></TR>
```

623 {
```
27 |<TR><TH ALIGN=LEFT><P>Maximum Concurrency:</TH>
28 |<TD ALIGN=LEFT>5</TD>
29 |<TR VALIGN=BASELINE>
```

624 {
```
30 |<TH ALIGN="LEFT"><P>Trace Level: </TH><TD>
31 |<SELECT NAME="Trace Level">
32 |<OPTION SELECTED> Warnings
33 |<OPTION> Errors
34 |<OPTION> Info
35 |<OPTION> Debug
36 |<OPTION> Trace
37 |<OPTION> Everything
38 |</SELECT>
39 |</TD></TR>
```

626 {
```
40 |<TR VALIGN=BASELINE>
41 |<TH ALIGN="LEFT"><P>OSL Traces Enabled: </TH><TD>
42 |<SELECT NAME="OSL Traces Enabled">
43 |<OPTION SELECTED> Off
44 |<OPTION> On
45 |</SELECT>
46 |</TD></TR>
```

628 {
```
47 |<TR VALIGN=BASELINE>
48 |<TH ALIGN="LEFT"><P>Script Directory/Vol: </TH><TD>
49 |<INPUT NAME="Script Directory/Vol"
50 |TYPE=TEXT VALUE="aehamtcl">
51 |</TD></TR>
```

630 {
```
52 |<TR VALIGN=BASELINE>
53 |<TH ALIGN="LEFT"><P> Script File: </TH><TD>
54 |<INPUT NAME="Script File"
55 |TYPE=TEXT VALUE="hamhtml.tcl">
56 |</TD></TR>
```

632 {
```
57 |<TR VALIGN=BASELINE>
58 |<TH ALIGN="LEFT"><P>Cache Tcl Scripts:</TH><TD>
59 |<SELECT NAME="Cache Tcl Scripts">
60 |<OPTION SELECTED> On
61 |<OPTION> Off
62 |</SELECT>
63 |</TD></TR>
```

634 {
```
64 |<TR VALIGN=BASELINE>
65 |<TH ALIGN="LEFT"><P>Tcl Trace Enabled: </TH><TD>
66 |<SELECT NAME="Tcl Trace Enabled">
67 |<OPTION SELECTED> Off
68 |<OPTION> On
69 |</SELECT>
70 |</TD></TR>
```

FIG. 6A hamset.html

```
71 | <TR VALIGN=BASELINE>
72 | <TH ALIGN="LEFT"><P>Maximum Size of Synthesized Page:</TH><TD>
73 | <INPUT NAME="Maximum Size of Synthesized Page"
74 | TYPE=TEXT VALUE="8192">
75 | </TD></TR>
76 | <TR><TH ALIGN=LEFT><P><INPUT TYPE="reset" VALUE="RESET">
   | </TH>
77 | <TD ALIGN=LEFT><INPUT TYPE="submit" VALUE="APPLY"></TD>
   </TR>
78 | </TABLE>
79 | </FORM>
80 | <P>Go to <A HREF="http://mad.hprc.tandem.com:8080/ham/cget/TCP%3a
     168.87.28.7%2f8062%3aHAM%2fHyperMedia%20Adapter%20NSK%2f
     Configuration/"><STRONG>Browse-Only Mode</STRONG></A> of
81 | <STRONG>Configuration</STRONG>
82 | <P>
83 | <P><CENTER><IMG SRC="/icons/pcbrblu.gif"></CENTER><P>
84 | <BR><A HREF: "http://mad.hprc.tandem.com:8080/ham/get/"
     TARGET="_top">
85 | <IMG SRC="/icons/icback.gif">HAM Home Page</A>
86 | </BODY></HTML>
```

*FIG. 6B*

```
hamhead.html

1 | <HTML>
 2 | <HEAD>
 3 | <TITLE>HyperMedia Adapter NSK@TCP:168.87.28.7/8062:HAM </TITLE>
 4 | <BASE HREF="http://mad.hprc.tandem.com:8080/ham/get/TCP%3a168.87.28.
     7%2f8062%3aHAM%2fHyperMedia%20Adapter%20NSK/">
 5 | </HEAD>
 6 |
 7 | <BODY BACKGROUND="/icons/icstgry.gif">
 8 | <TABLE WIDTH="100%" HEIGHT="100%" ALIGN="CENTER" ]
 9 |         BORDER="4">
10 | <TR><TH><FONT SIZE=5>HyperMedia Adapter NSK</FONT></TH>
     </TR>
11 | </TABLE></BODY></HTML>
```

} 702

FIG. 7A hamtrail.html

```
 1 | <HTML> ^M
 2 | <HEAD> ^M
 3 | <TITLE>Ham Trailer Frame</TITLE> ^M
 4 | </HEAD> ^M
 5 | <BODY BACKGROUND="/icons/icstgry.gif"> ^M
 6 | <TABLE WIDTH="100%" BORDER=4> ^M
 7 | <TR><TD ALIGN=LEFT> ^M
 8 | <FONT SIZE=5><IMG ALT=" " SRC="pctorm.gif" ALIGN=LEFT > ^M
 9 | HAM & ORM</FONT><BR> ^M
10 | This page was generated by <B>HAM</B>, ^M
11 | the <I>Hypermedia Adaptor for management</I>. ^M
12 | <A HREF="http://far.hprc.tandem.com:8888/info/imham.html"
     TARGET="_top"> ^M
13 | <B>HAM</B></A> ^M
14 | uses the <I>Object Resource Management</I> (ORM ) ^M
15 | protocol to communicate ^M
16 | with managed objects.<BR> ^M
17 | Both HAM and ORM are <I>Foundation Computing products</I> of the
18 | <I>Tektonic Initiative</I>. ^M
19 | </TD></TR> ^M
20 | </TABLE> ^M
21 | </HTML> ^M
```

ORM Protocol Examples

| hamindex.html |
|---|

```
1  | <HTML>
2  | <HEAD>
3  | <TITLE>Index into HyperMedia Adapter NSK@TCP: 168.87.28.7/8062:HAM
     </TITLE>
4  | <BASE HREF="http://mad.hprc.tandem.com:8080/ham/get/TCP%3a168.87.28.7
     %2f8062%3aHAM%2fHyperMedia%20Adapter%20NSK/">
5  | </HEAD>
6  |
7  | <BODY BACKGROUND="/icons/icstgry.gif">
8  | <H3><A HREF="http://mad.hprc.tandem.com:8080/ham/cget/TCP%3a168.87.
     28.7%2f8062%3aHAM%2fHyperMedia%20Adapter%20NSK%2fProduct%20
     Information//"TARGET="hamcontent">
9  | <IMG ALT=" " SRC="/icons/icbox.gif">
10 | Product Information </A></H3>
11 | <H3><A HREF="http://mad.hprc.tandem.com:8080/ham/cget/TCP%3a168.87.
     28.7%2f8062%3aHAM%2fHyperMedia%20Adapter%20NSK%2fInstance%20Infor
     mation// "TARGET="hamcontent">
12 | <IMG ALT=" " SRC="/icons/icinstc.gif">
13 | Instance Information </A></H3>
14 | <H3><A HREF="http://mad.hprc.tandem.com:8080/ham/cget/TCP%3a168.
     87.28.7%2f8062%3aHAM%2fHyperMedia%20Adapter%20NSK%2fConfiguration//
     "TARGET="hamcontent">
15 | <IMG ALT=" " SRC="/icons/iccnfig.gif".
16 | Configuration </A></H3>
17 | <H3><A HREF="http://mad.hprc.tandem.com:8080/ham/cget/TCP%3a168.87.
     28.7%2f8062%3aHAM%2fHyperMedia%20Adapter%20NSK%2fStatistics//
     " TARGET="hamcontent">
18 | <IMG ALT=" " SRC="/icons/icstats.gif">
19 | Statistics </A></H3>
20 | <P>
21 | <P><IMG SRC="/icons/pcsbblu.gif"><P>
22 | <P><A HREF="http://mad.hprc.tandem.com:8080/ham/get/"TARGET="_top">
23 | <IMG SRC="/icons/icback.gif"> HAM Home Page </A>
24 | </BODY></HTML>
```

ORM Protocol Examples

```
                                     ham.trace
 1  | A request as issued to create the index frame as seen in  ⎫
 2  | the left frame of the window dump                         |
 3  |                                                            |
 4  | > > > > >                                                  |
 5  | OrmVersion:1.0        ─820                                 |
 6  | OrmGet:HyperMedia Adapter NSK   ─822                       ⎬ 802
 7  | Info         ⎫                                             |
 8  | Component    ⎬─824                                         |
 9  | Object       ⎭                                             |
10  |                                                            ⎭
11  | < < < < <
12  |
13  |
14  | And its response:                                          ⎫
15  |                                                            |
16  | > > > > >                                                  |
17  | OrmVersion:1.0                                             |
18  | OrmGet:HyperMedia Adapter NSK                              ⎬ 804
19  | Component: Product Information                             |
20  | Component: Instance Information                            |
21  | Component: Configuration                                   |
22  | Component: Statistics                                      ⎭
23  |
24  | < < < < <
25  |
26  |
27  |
28  | A Browse Request as issued for the Frame on the right side ⎫
29  | of the window dump (compare hamset.html)                   |
30  | > > > > >                                                  |
31  | OrmVersion:1.0                                             ⎬ 806
32  | OrmGet:HyperMedia Adapter NSK/Configuration ─830           |
33  | Info                                                       |
34  | Component                                                  |
35  | Object                                                     ⎭
36  |
37  | < < < < <                                                  ⎫
38  | And its response                                           |
39  | > > > > >                                                  |
40  | OrmVersion:1.0                                             |
41  | OrmGet:HyperMedia Adapter NSK/Configuration                |
42  | Attribute:Status                                           |
43  | Value:Running                                              |
44  | Mode:RO                                                    |
45  | Field:Enum                                                 |
46  | Range:Suspended,Aborted,Stopped                            |
47  | Attribute:Change Status to                                 |
48  | Value:Running                                              |
49  | Mode:WO                                                    |
50  | Field:Enum                                                 |
51  | Range:Suspended,Aborted,Stopped                            |
52  | Attribute:Maximum Concurrency                              |
53  | Value:5                                                    |
54  | Mode:RO                                                    ⎬ 808
55  | Field: Int                                                 |
56  | Range:1...20                                               |
57  | Attribute:Trace Level                                      |
58  | Value:Trace                                                |
59  | Mode:RW                                                    |
60  | Field:Enum                                                 |
61  | Range,Errors,Warnings,Info,Debug,Everything                |
62  | Attribute:OSL Traces Enabled                               |
63  | Value:Off                                                  |
64  | Mode:RW                                                    |
65  | Field:Enum                                                 |
66  | Range:On                                                   |
67  | Attribute:Script Directory/Vol                             |
68  | Value:aehamtcl                                             |
69  | Mode:RW                                                    |
70  | Field:String                                               |
71  | Attribute:Script File                                      |
72  | Value:hamhtml.tcl                                          |
73  | Mode:RW                                                    ⎭
```

*FIG. 8A*

| ham.trace |
|---|

```
 74 | Field:String
 75 | Attribute:Cache Tcl Scripts
 76 | Value:On
 77 | Mode:RW
 78 | Field:Enum
 79 | Range:Off
 80 | Attribute:Tcl Trace Enabled
 81 | Value:On
 82 | Mode:RW
 83 | Field:Enum
 84 | Range:Off
 85 | Attribute:Maximum Size of Synthesized Page
 86 | Value:8192
 87 | Mode:RW
 88 | Field:Int
 89 | Range:2048...16384
 90 |
 91 | <<<<<<<
 92 |
 93 | A Set/Change Request as a result from the
 94 | HTML FORM processing:
 95 |
 96 | >>>>>
 97 | OrmVersion:1.0
 98 | OrmSet:HyperMedia Adapter NSK/Configuration
 99 | Attribute:Change Status to
100 | Value:Running
101 | Attribute:Trace Level
102 | Value:Trace
103 | Attribute:OSL Traces Enabled
104 | Value:Off
105 | Attribute:Script Directory/Vol
106 | Value:aehamtcl
107 | Attribute:Script File
108 | Value:hamhtml.tcl
109 | Attribute:Cache Tcl Scripts
110 | Value:On
111 | Attribute:Tcl Trace Enabled
112 | Value:On
113 | Attribute:Maximum Size of Synthesized Page
114 | Value:8192
115 | OrmGet:HyperMedia Adapter NSK/Configuration
116 | Info
117 |
118 | <<<<<
119 |
120 | Response similar to Get Request above
121 |
122 |
```

Lines 74–89 form group *808*. Lines 92–119 form group *810*. Line 97–98 marked *840*.

*FIG. 8B*

HYPER MEDIA OBJECT MANAGEMENT

RELATED APPLICATION

The following related U.S. applications are hereby incorporated by reference: U.S. application Ser. No. 08/680,270 (pending) entitled "Method and Apparatus for Describing an Interface Definition Language-Defined Interface, Operation, and Data Type" by A. Schofield, filed Jul. 11, 1996; U.S. application Ser. No. 08/678,681 (pending) entitled "Method and Apparatus Using Parameterized Vectors For Converting Interface Definition Language-Defined Data Structures into a Transport and Platform Independent Format" by A. Schofield, filed Jul. 11, 1996; U.S. application Ser. No. 08/680,203 (now U.S. Pat. No. 5,860,072) entitled "Data Structure Representing An Interface Definition Language Source File" by A. Schofield, filed Jul. 11, 1996; U.S. application Ser. No. 08/680,203 (now U.S. Pat. No. 5,860,072) entitled "Method and Apparatus for Transporting Interface Definition Language-Defined Data Structures Between Heterogeneous Systems" by A. Schofield filed Jul. 11, 1996; U.S. application Ser. No. 08/678,295 (pending) entitled "Method and Apparatus for Performing Distributed Object Calls" by A. Schofield filed Jul. 11, 1996; U.S. application Ser. No. 08/680,202 (pending) entitled "Method and Apparatus for Asynchronously Calling and Implementing Objects" by A. Schofield, filed Jul. 11, 1996; U.S. application Ser. No. 08/680,266 (pending) entitled "Method and Apparatus for Performing Distributed Object Calls using Proxies and Memory Allocation" by A. Schofield filed Jul. 11, 1996.

APPENDICES

Appendix A, which is herein incorporated by reference, shows examples of formats used to communicate between a server and an object manager.

Appendix B, which is herein incorporated by reference, shows examples of an ORM Server Support library API (Application Program Interface) supported by the object manager to access objects in a preferred embodiment of the present invention.

FIELD OF THE INVENTION

This application relates to object oriented programming and, in particular, to management of distributed objects via the World Wide Web.

BACKGROUND OF THE INVENTION

The past several years have seen an explosive growth of the use of distributed objects. Now, a single system may be composed of objects obtained from different vendors and having different interfaces. Such objects are called "heterogeneous objects." Thus, a system can be formed of a large and rapidly changing number of heterogeneous objects. Such a system requires a flexible and adaptive approach for system and application management. Conventionally, a heterogeneous system is managed by way of object-specific presentation facilities, i.e., by way of a user front-end that was written for each type of heterogeneous object. Such an approach is, however, too expensive in both development time and maintenance and administrative costs. In addition, conventional object management is often achieved through a single management center. Use of a single center is not efficient when a large number of objects need to be managed.

SUMMARY OF THE INVENTION

The present invention overcomes the problems and disadvantages of the prior art by using a hypermedia approach to object management. In this approach, each object is akin to a hypermedia document. The described embodiment of the present invention uses the World Wide Web hypermedia system. In a preferred embodiment of the present invention, a user initializes browser software that allows the user to browse and change various attributes of objects in the system. The browser communicates with a server that includes an http adapter and a gateway. The gateway can access objects in the system and generate HTML code in accordance with the objects.

A described embodiment of the present invention uses hierarchical tree-oriented objects. In a first embodiment, these objects are "self-describing"(also called "introspective"). The server queries the objects in response to the queries from the browser and each queried object responds with information about itself. In another preferred embodiment, the server initiates queries of the objects and retains this information for use in responding to later queries from the browser.

In accordance with the purpose of the invention, as embodied and broadly described herein the invention is a system for managing objects, including a first server, comprising: a first receiver portion configured to receive a request in a hypermedia format; a first translator portion configured to convert the hypermedia request to an object request; a sender portion configured to send the object request to an object manager; a second receiver portion configured to receive a response from the object manager; and a second translator portion configured to convert the object manager response to the hypermedia format.

In further accordance with the purpose of this invention, as embodied and broadly described herein the invention is a method for browsing objects, where a browser communicates with a server, comprising the steps, performed by the browser, of: sending an initial URL to the server; receiving first data from the server, where the first data specifies an object corresponding to the URL; sending user-entered data associated with the object to the server; and receiving second data from the server, where the second data specifies a second object corresponding to the user-entered data.

Advantages of the invention will be set forth in part in the description which follows and in part will be obvious from the description or may be learned by practice of the invention. The advantages of the invention will be realized and attained by means of the elements and combinations particularly pointed out in the appended claims and equivalents.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIGS. 6(a) and 6(b) show an example of HTML that causes the browser to display a portion of the page of FIG. 5.

FIGS. 7(a) through 7(c) show further examples of HTML that result in the portions of page of FIG. 5.

FIGS. 8(a) and 8(b) show several examples of ORM (Object Resource Management) requests made by the server to the object manager and the resulting responses from the object manager.

DETAILED DESCRIPTION OF PREFERRED EMBODIMENTS

Reference will now be made in detail to a preferred embodiment of the invention, an example of which is illustrated in the accompanying drawings. Wherever possible, the same reference numbers will be used throughout the drawings to refer to the same or like parts.

I. System Overview

Figure 1:
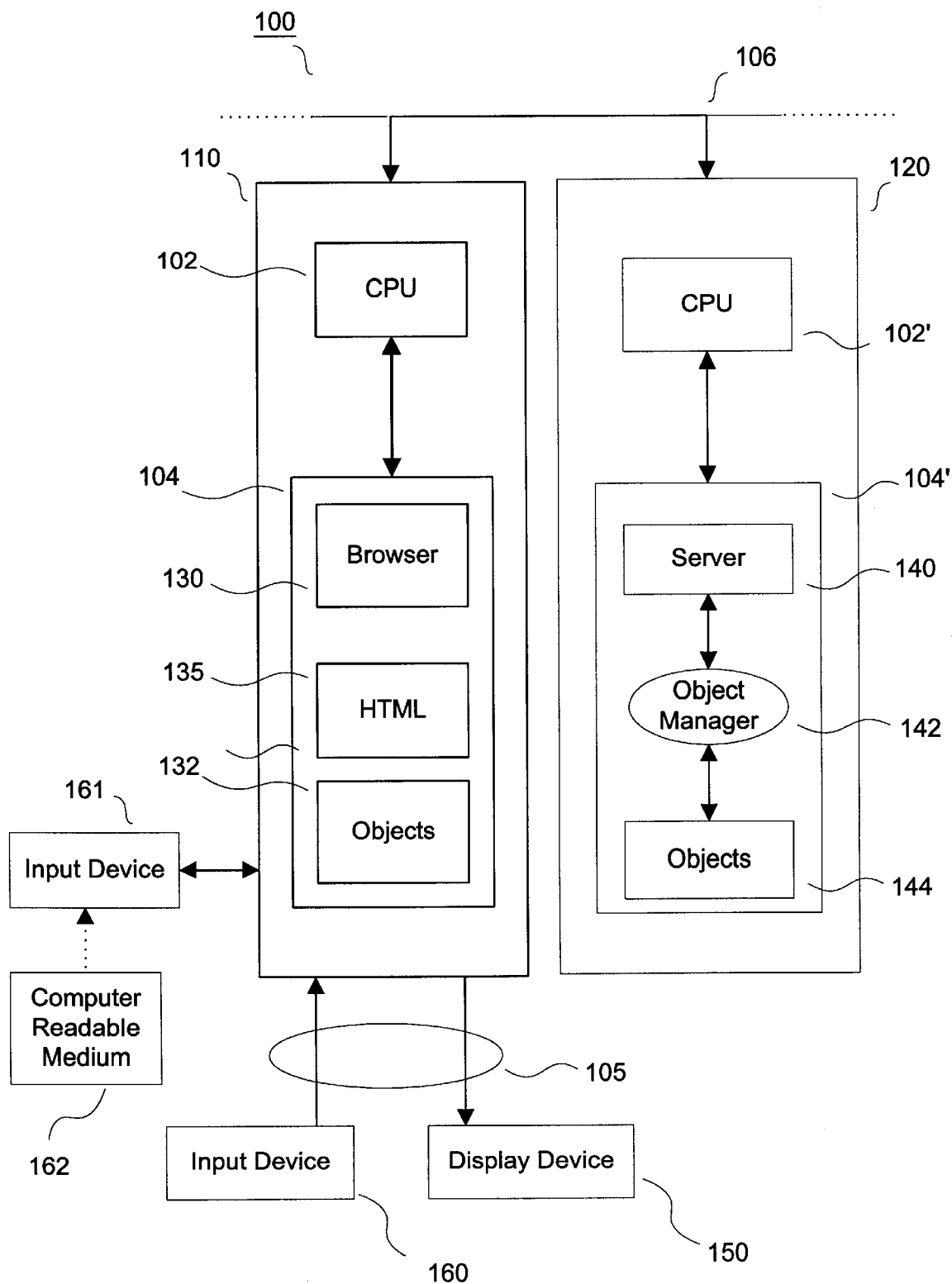
FIG. 1 is a block diagram of a computer system in accordance with a preferred embodiment of the present invention.

FIG. 1 is a block diagram of a computer system 100 in accordance with a preferred embodiment of the present invention. Computer system 100 includes a first computer 110 and a second computer 120. First computer 110 and second computer 120 are connected together via line 106, which can be, for example, a LAN, a WAN, or an internet connection. Line 106 can also represent a wireless connection, such as a cellular network connection.

First computer 110 includes a CPU 102; a memory 104; input/output lines 105; an input device 160, such as a keyboard or mouse; and a display device 150, such as a display terminal. First computer 110 also includes an input device 161 that reads computer instructions stored on computer readable medium 162. These instructions are the instructions of e.g., browser software 130. Memory 104 of first computer 110 includes browser software 130, Hypertext Markup Language (HTML) 135, and objects 132. A person of ordinary skill in the art will understand that memory 104 also contains additional information, such as application programs, operating systems, data, etc., which are not shown in the figure for the sake of clarity.

Second computer 120 includes a CPU 102' and a memory 104'. Memory 104' of second computer 120 includes server software 140, an object manager (ORM) 142, and objects 144. HTML 135 in the memory of first computer 110 was downloaded over line 106 from server 140 of second computer 120. A person of ordinary skill in the art will understand that memory 104' also contains additional information, such as application programs, operating systems, data, etc., which are not shown in the figure for the sake of clarity. Server 140, object manager 142, and objects 144 can also be located in memory 104 of first computer 110.

It will be understood by a person of ordinary skill in the art that computer system 100 can also include numerous elements not shown in the Figure for the sake of clarity, such as disk drives, keyboards, display devices, network connections, additional memory, additional CPUs, LANs, input/output lines, etc.

The following paragraphs provide a general discussion of the World Wide Web ("the Web"). The Web is built around a network of "server" computers, such as second computer 120, which exchange requests and data with each other using the hypertext transfer protocol ("http"). A human designer designs the layout of a Web page, which is then specified using HTML ("Hypertext Markup Language"). Several versions of HTML are currently in existence. Examples include HTML versions 2.0 and 3.0, as specified by the WWW Consortium of MIT. The HTML used in the described embodiment of the invention includes frames, forms, and tables, as are known to persons of ordinary skill in the art.

A user views a Web page using one of a number of commercially available "browser" programs. The browser submits an appropriate http request to establish a communications link with a Web server of the network. A typical http request references a Web page by its unique Uniform Resource Locator ("URL"). A URL identifies the Web server hosting that Web page, so that an hftp request for access to the Web page can be routed to the appropriate Web server for handling. Web pages can also be linked graphically to each other.

Figure 2:
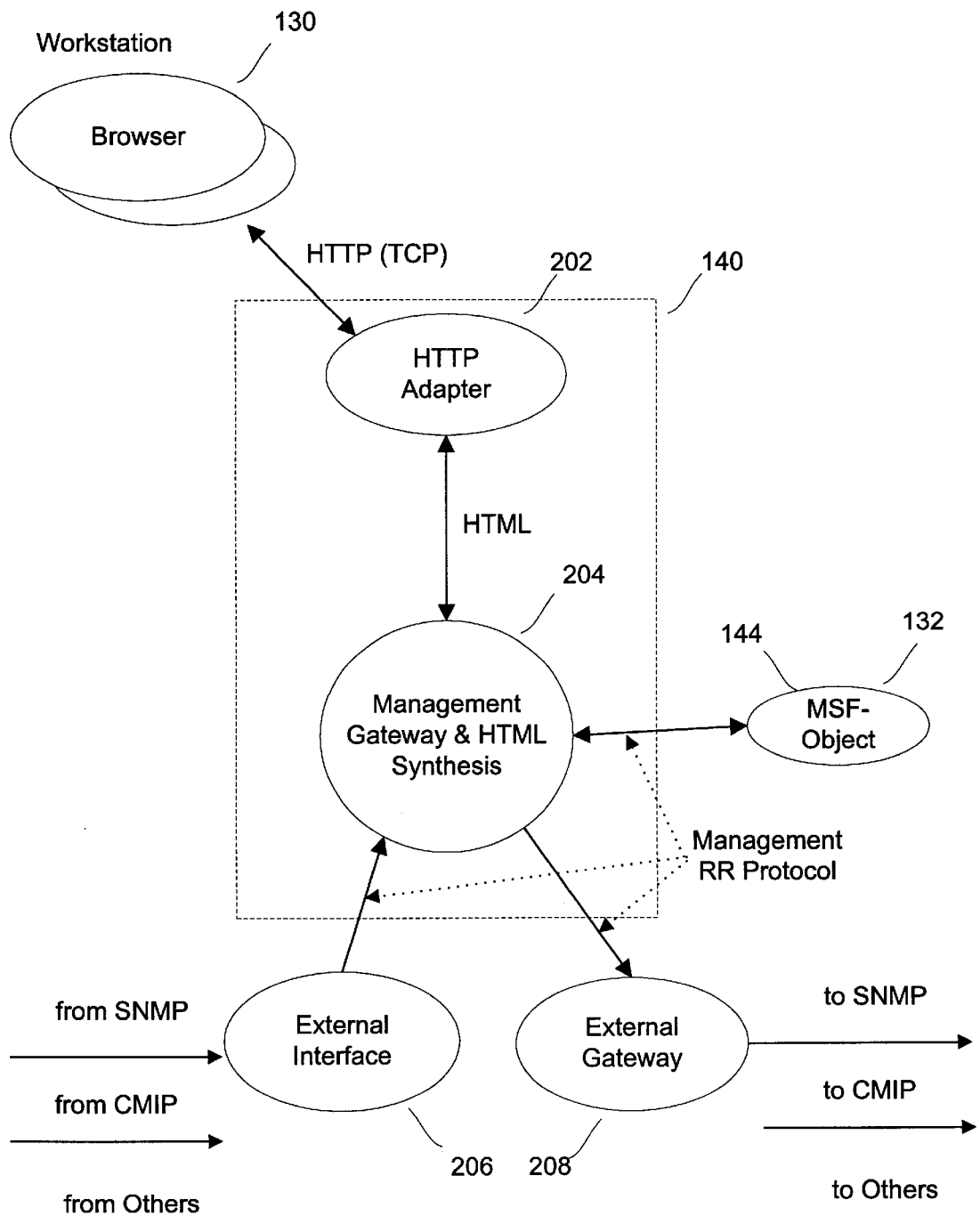
FIG. 2 is another block diagram of a computer system in accordance with a preferred embodiment of the present invention.
Figure 4:
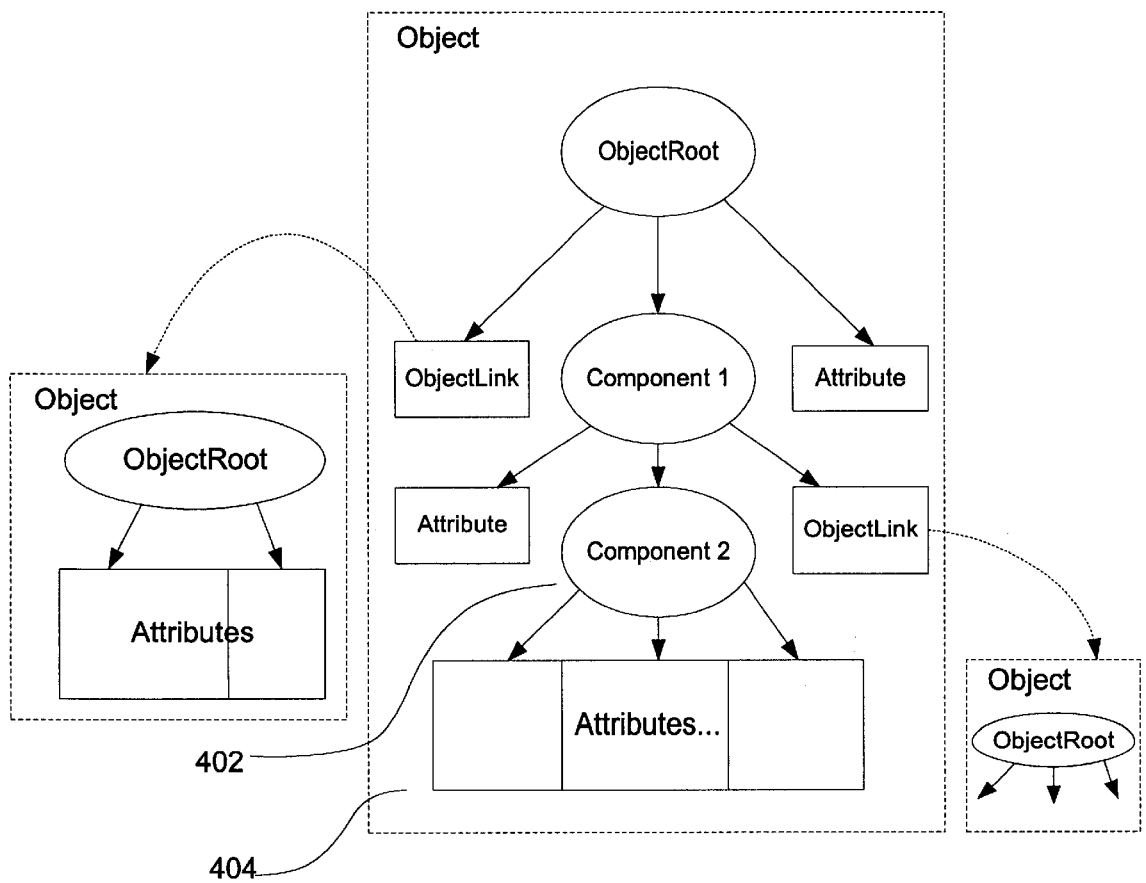
FIG. 4 is a diagram of a format in which objects are organized.

FIG. 2 is an additional block diagram of a computer system in accordance with a preferred embodiment of the present invention. Browser 130 communicates with server 140. Server 140 includes an http adapter 202 and a management gateway 204. Http Adapter 202 handles communication via the known http protocol. Management gateway 204 communicates with object manager 142. Server 140 communicates with one or more objects 132, 144 using a request/response (RR) protocol, such as the ORM (Object Resource Management) protocol, which is discussed below. Note that objects 132 and 144 can be located on the same or different physical computers or machines. Server 140 also communicates with external interface 206, which communicates using the known SNMP and CMIP protocols. Server 140 also communicates with external gateway 208, which communicates using the known SNMP and CMIP protocols. The system can contain more than one servers 140 and more objects than are shown in FIG. 4.

Figure 3:
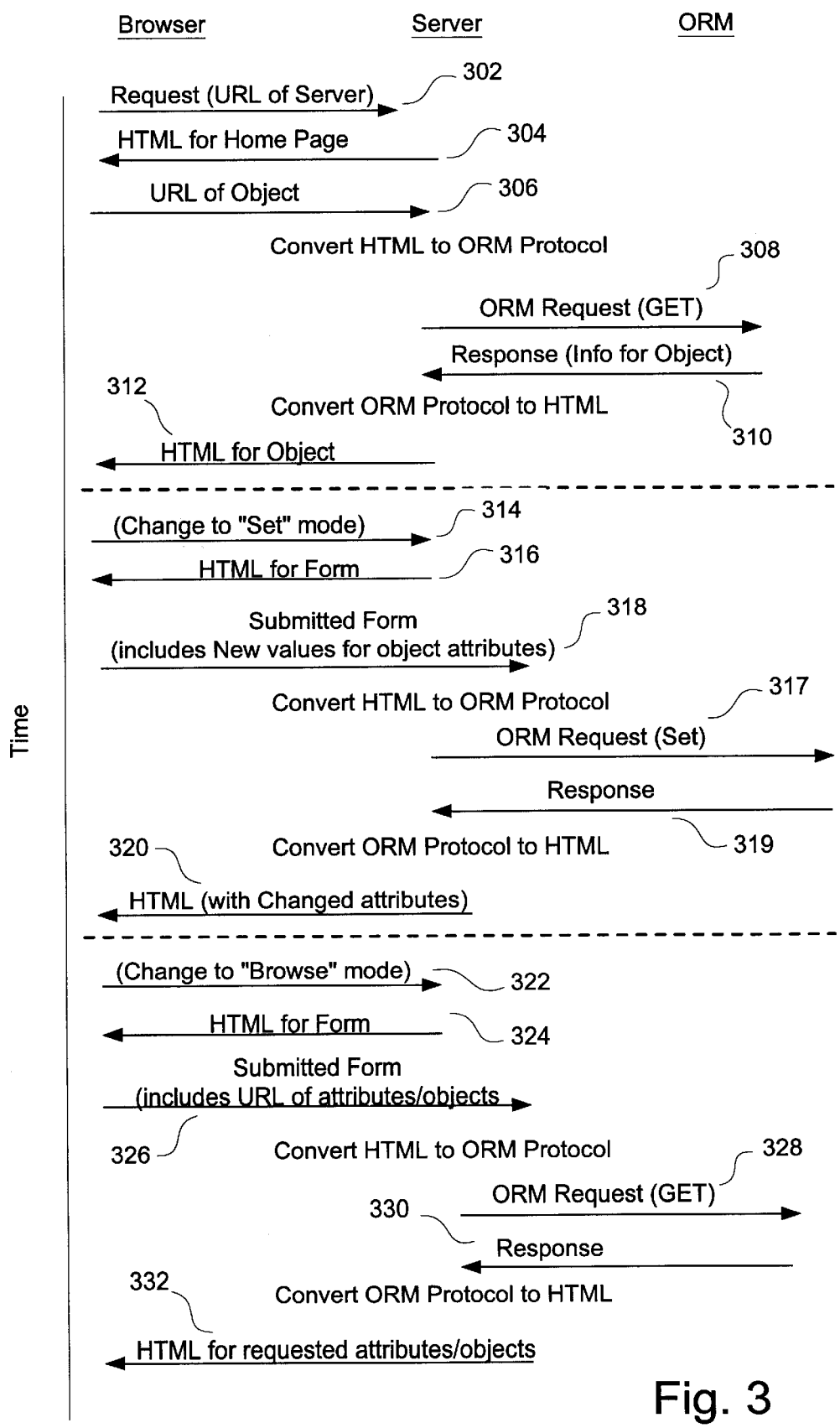
FIG. 3 is a diagram of data sent between a browser, server, and object manager in accordance with the embodiment of FIG. 1.

FIG. 3 is a diagram of data sent between a browser, server, and object manager in accordance with the embodiment of FIG. 1. In the example of FIG. 3, the user has already begun execution of browser software 130. In step 302, the user enters the URL of server 140 by way of browser 130. The browser sends a request to the server and, in step 304, the server responds with the HTML to generate a home page. The home page allows the user to enter a URL (or to chose a URL from those known provided within the HTML of the home page). The user can then chose to set/browse objects in the system, as described below. The user can also request information and statistics about once or more objects in the system.

In step 306, the user enters a URL of an object by way of browser 130. Server 140 converts the URL to a request to an object manager. For example, in the described embodiment, server 140 converts the URL to an ORM request, as described below. The ORM request is sent to the object manager, which returns object data in steps 308 and 310. Server 140 converts the object data into HTML, which is sent to browser 130 in step 312. The HTML may be based on a predetermined page template known to the server. Alternately, the format of a page may be determined "on the fly" based on the information obtained from the object manager. Server 140 converts all pathnames, such as object-links in the object data (see FIG. 4) to URLs in HTML and vice versa. Thus, if a user clicks on an area in a page displayed by the browser that corresponds to an object-link, browser 130 has the URL corresponding to that object-link. This new URL is sent to the server, which obtains the page information and sends HTML to display information for the object connected to the object-link.

Steps 314 through 320 represent a "set" mode, in which the user enters new values for an object by way of browser 130. In step 314, the user indicates that he wishes to enter "set" mode. This indication is usually accomplished by clicking on a button in the current page (thus, the HTML generated by server 140 should include HTML for this button). In step 316, server 140 sends a "form" for set mode. In step 318, the user enters new values into the form and clicks on "submit" (or "apply", (see FIG. 5), as is known to persons of ordinary skill in the art. Server 140 converts the submitted form to, for example, an ORM request, as described below. The ORM request is sent to the object manager, which returns object data in steps 317 and 319. Server 140 converts the object data of step 319 into HTML, which is sent to browser 130 in step 320.

Steps 322 through 332 represent a "browse" mode, in which the user views values associated with an object by way of browser 130. In step 322, the user indicates that he wishes to enter "browse" mode. This indication is usually accomplished by clicking on a button in the current page (thus, the HTML generated by server 140 should include HTML for this button). In step 324, server 140 sends a "form" for browse mode. In step 326, the user enters new values into the form and clicks on "submit" (or "apply", see FIG. 5), as is known to persons of ordinary skill in the art. Server 140 converts the submitted form to, for example, an ORM request, as described below. The ORM request is sent to the object manager, which returns data corresponding to the object in steps 328 and 330. Server 140 converts the response of step 330 into HTML, which is sent to browser 130 in step 332.

II. Hypermedia Object Management

A. Object Organization

FIG. 4 is a diagram of a format in which objects are organized in a preferred embodiment. This organization is transparent to server 140 and browser 130. It will be understood that the present invention can be used with a number of object organizations and with a number of object management protocols. The embodiment described herein uses the ORM protocol, as described below.

The model of FIG. 4 assumes the following:

1) Management operations can be mapped to two basic operations: a) Get an attribute (or a set of attributes) of an object and b) set an attribute (or set of attributes) of an object.

2) All entities to be managed can be organized as a directed tree with nodes and leaves where the nodes are either (callable) objects or components (sub-parts of objects) with attributes as the leaves (with combined name/pair values), and 3) All knowledge about management operations and attributes is built into and controlled by the managed object.

FIG. 4 shows the following types of entities:

1) Objects

Objects encapsulate and control management aspects and respective management operations. In the described embodiment, an object is identified by a "pathname," which is the destination for object calls. Each manageable object has its own virtual tree of components, attributes, and object-links.

2) Components

Components are the primary structuring mechanism within an object. Component sub-trees may be of arbitrary depth and component nodes may contain any number of object-links, other sub-components, or attributes.

3) Attributes

Attributes describe specific aspects of a component within an object (for example, "status=running" describes the state of a resource). Attribute nodes have additional properties beyond name and value, such s access mode and data type. Attribute nodes are leaves and do not have children.

4) Object-links

Object-links contain an object reference to a related object. As every object is responsible for its own virtual tree of resources, one object can provide a reference (hyperlink) to another object. Thus, in the described embodiment, a first object can have links to a second object, so that objects can be "walked" by way of browser 130.

5) Relations

Objects and components are the primary means for structuring and navigation in the described embodiment. Attributes have values that characterize the state of the resource. All operations (browsing and attribute retrieval/setting) are performed with respect to a single level of the tree (e.g., relative to a specific parent).

Server 140 preferably issues the following requests to object manager 142:

1) Get a list of linked objects,

2) Get a list of components and/or sub-components,

3) Get a list of attributes,

4) Set a list of attributes (Along with name/value pairs for each attribute), and 5) Get an extended list of attributes, which returns meta-information about the attribute, such as data type, allowed access mode (ro, rw) or valid ranges of new attribute values. Within the ORM model, all management operations are mapped to these five operations. Thus, every managed object preferably supports these five operations.

It should be understood that the attributes and object types shown in the examples herein are included only for the purposes of example. The present invention can be practiced using any appropriate object organization and type.

B. Server Interface

In the described embodiment, all messages passing in and out of server 140 are ASCII messages.

A example URL for object 402 of FIG. 4 would look like:

Http://ham/get/objectRoot/Component1/Component2/

A example URL for attribute 404 of FIG. 4 would look like:

Http://ham/get/objectRoot/Component1/Component2/Attr1/

In both of these URLS, "ham" stands for "HyperMedia Adapter to Management" and represents the address of server 140; "get" (this could also be "set") represents an operation to be performed on an object or attribute; and the remainder of the URL represents the tree of the object or attribute known to the object manager. Other URLs may also include additional information use, for example, by the object manager.

Figure 5:
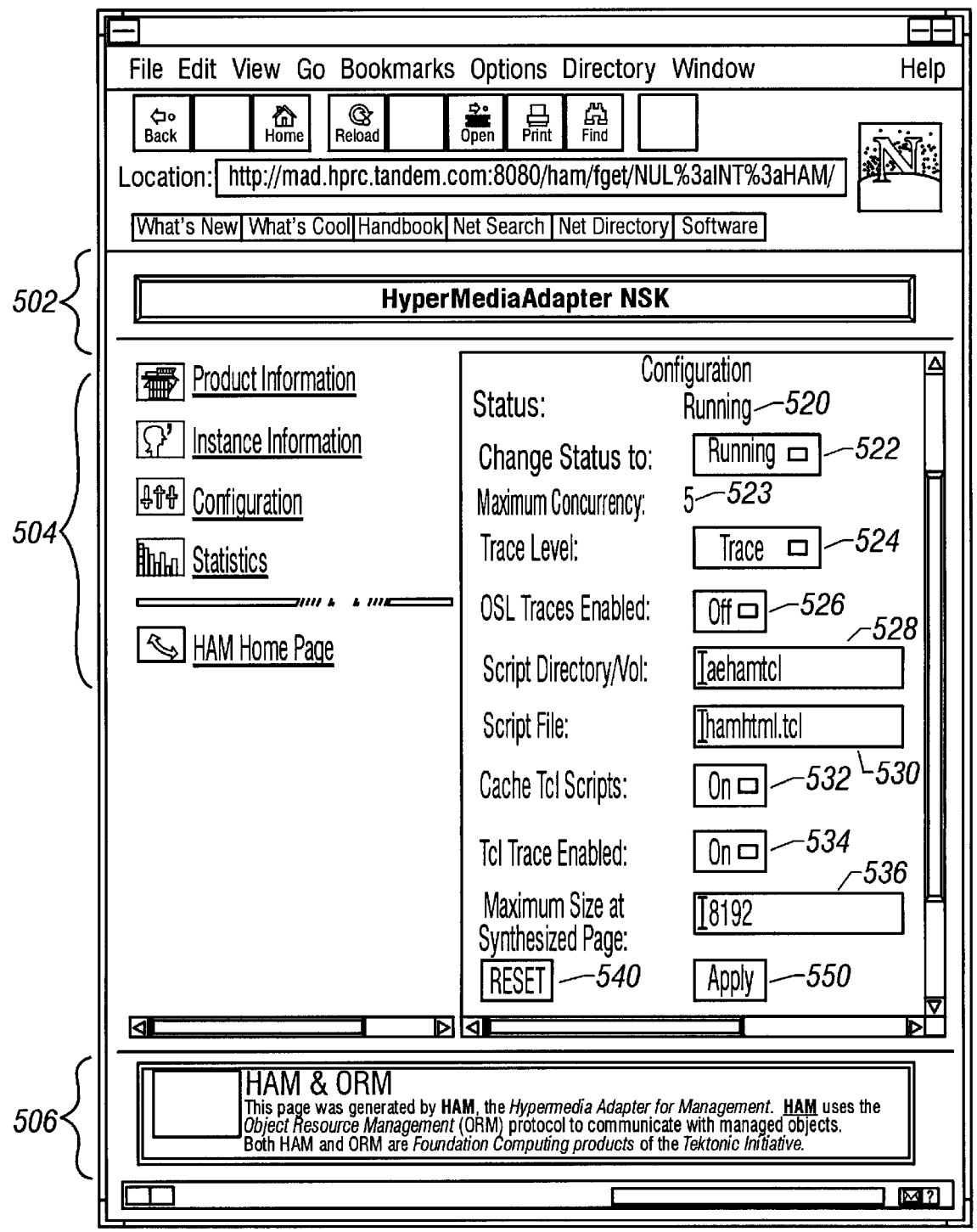
FIG. 5 shows another example of a page displayed by the browser.

FIG. 5 shows a page displayed by browser 130 in "set" mode. FIG. 5 shows the values of attributes for a "Configuration" object component. These attributes include:

1) Status 520,
2) Maximum Concurrency 523,
3) Trace Level 524,
4) OSL Traces Enabled 526,
5) Script directory/Vol. 528,
6) Script File 530,
7) Cache Tcl Scripts 532,
8) Tcl Trace Enabled 534, and
9) Maximum Size of Synthesized Page 536.

FIG. 5 also shows an entry 522 for changing the status attribute. It should be understood that the attributes of FIG. 5 are presented for the sake of example only and are not to be taken in a limiting sense. FIG. 5 also shows a reset button 540 and an apply button 550. When the user clicks reset button, original attribute values are returned. When apply button 550 is clicked, browser 130 posts a form, as is known to persons of ordinary skill in the art.

FIGS. 6(*a*) and 6(*b*) show an example of HTML generated by server 140. When browser 130 interprets the HTML of FIG. 6, it generates the portion containing attribute values 520–536 and buttons 540, 550 of FIG. 5. FIGS. 7(*a*) through 7(*c*) show an example of HTML generated by server 140. When browser 130 interprets the HTML 702, 704, and 706 of FIGS. 7(*a*) through 7(*c*), it generates portions 502, 506, and 504, respectively, of FIG. 5.

Figure 9:
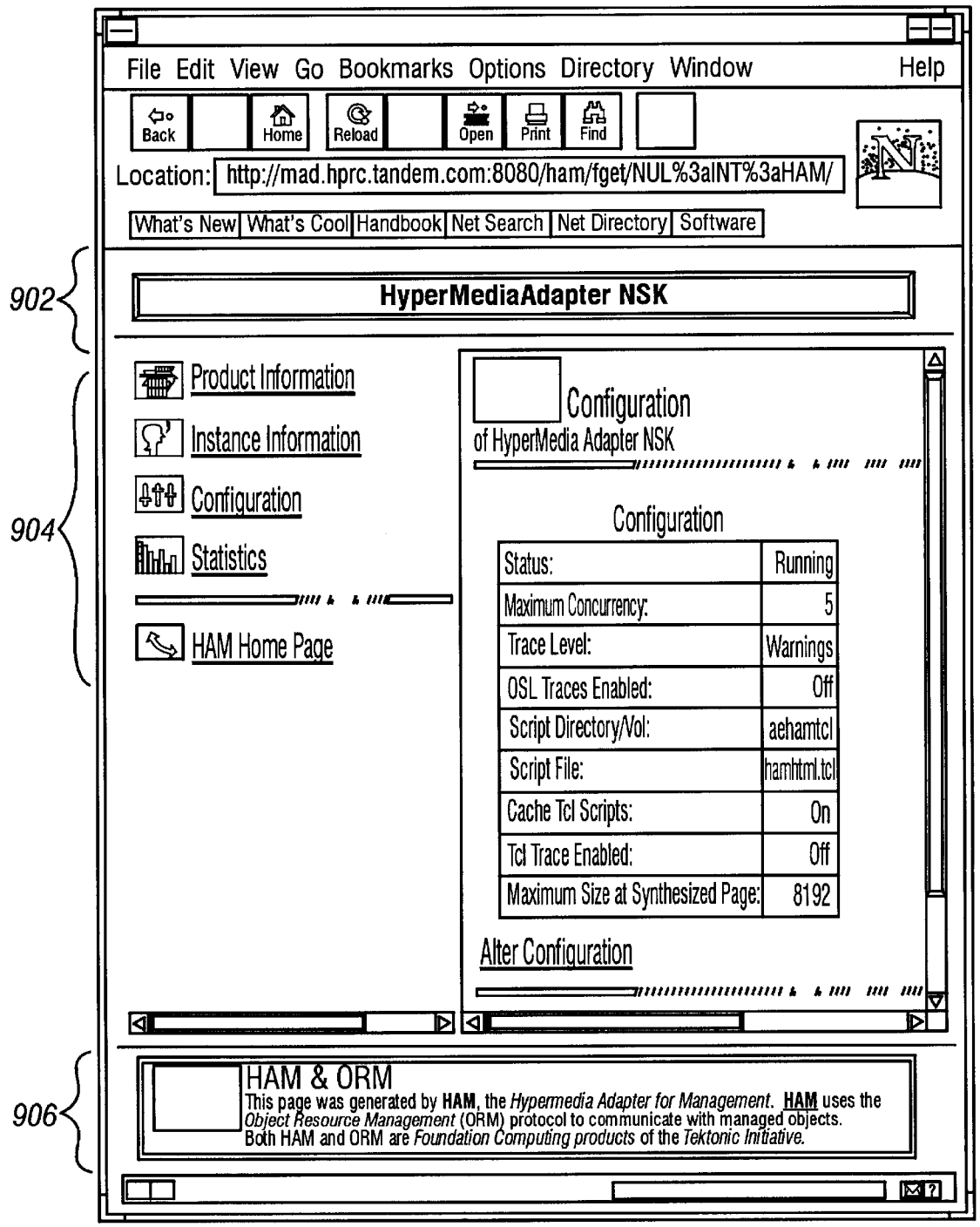
FIG. 9 shows another page displayed by the browser.

FIG. 9 shows another page displayed by browser 130 in accordance with HTML generated by server 140. The page of FIG. 9 is used to browse objects, but cannot change the attributes of objects.

The previous paragraphs discuss the browser GUI presented to the user and how server 140 translates between HTML and a protocol understood by the object manager. The following paragraphs describe the protocol used to communicate with object manager 142 about objects and to change objects in accordance with the HTML received by the server.

FIGS. 8(*a*) and 8(*b*) show several examples of ORM requests made by the server 140 to object manager 142 and the resulting responses from object manager 142. Appendix A shows formats of such requests and responses. Request 802 is an example of an OrmGet request sent from server 140 to object manager 142. The format of an OrmGet request is:

OrmGet: pathname entity types where pathname is a name of an object or an attribute. Possible entity types are: "Object" (all known objects at this level), "Component" (a list of all components below the level of the path specified in the OrmGet), "Attribute" (a list of attributes for the current node; for every attribute, its name and "stringified value is returned; if the pathname already navigates to an attribute, the object manager returns the empty string), "Info" (returns "meta-attributes" such as mode, range and unit), and <none> (i.e., an empty string).

In request 802 of FIG. 8, the server "knows" about an object "HyperMedia Adapter NSK", possibly from receiving a URL from browser 130. Line 820 represents a version of the server (e.g., version 1.0). Line 822 is an "OrmGet" request for object "HyperMedia Adapter NSK". Server 140 requests information from object manager 142 about entity types (Info), Component, and Object (lines 824).

Response 804 is generated by object manager 142 and sent to server 140. The object has four components, no info, and no objects at the same level. As seen in step 312 of FIG. 3, server 140 generates HTML 604 of FIG. 7(*c*) in accordance with response 804 and sends the generated HTML to browser 130.

Assuming that the user wants to browse information about the Configuration component of object "HyperMedia Adapter NSK", browser 130 sends a request to server 140 to this effect. Server 140 then sends request 806 to the object manager, which responds with response 808. Request 806 is similar to request 802, but the pathname in line 830 is "HyperMedia Adapter NSK/Configuration".

Response 808 includes attributes for the "Info" entity. Thus, the response includes an attribute value, mode, field, and range for each of ten attributes of the component "Configuration". As seen in step 332 of FIG. 3, server 140 generates the HTML of FIGS. 6(*a*) and 6(*b*) in accordance with response 808 and sends the generated HTML to browser 130 (see FIG. 5).

Assuming that the user wants to change one or more attributes of the Configuration component of object "HyperMedia Adapter NSK", browser 130 sends a request to server 140 to this effect (assuming that the browser is in "set" mode). Server 140 then sends request 810 to the object manager, which responds by sending a status value (not shown).

A format of the OrmSet request is:

OrmSet: pathname

Attribute: name

Value: val where "name" and "val" respectively, represent an attribute name and an attribute value. This command is shown in line 840. The command can include more than one Attribute/Value pairs.

In the example, request 810 specifies new values for eight attributes of component "Configuration." Assuming that no error occurs when the object manager changes the attribute values, server 140 generates HTML reflecting the new attribute values in accordance with the response and sends the generated HTML to browser 130 (not shown).

A preferred embodiment of the present invention has a server that interfaces with "self describing" (or "introspective") objects. The server sends requests to and receives responses from an ORM (Object Resource Manager). The system may include more than one ORM and more than one server. Each server may "know" about zero or more ORMs. Thus, the system is not centralized and does not necessarily depend on a central point to interface with the objects.

C. The Object Manager

1. Self Describing Objects

FIG. 4 shows an example of object organization in a preferred embodiment of the present invention. Appendix B, which is herein incorporated by reference, shows examples of an ORM Server Support Library API (Application Program Interface) supported by the object manager to access objects in a preferred embodiment of the present invention.

The routines in the API of Appendix B are used by object manager (e.g., ORM 142 of FIG. 1) to receive requests from server 140 and to prepare responses to the requests. It will be understood be persons of ordinary skill in the art that any object manager can be used in conjunction with the present invention, as long as the object manager is capable of communicating with server 140 and of fulfilling GetOrm and SetOrm requests from server 140.

Figure 10:
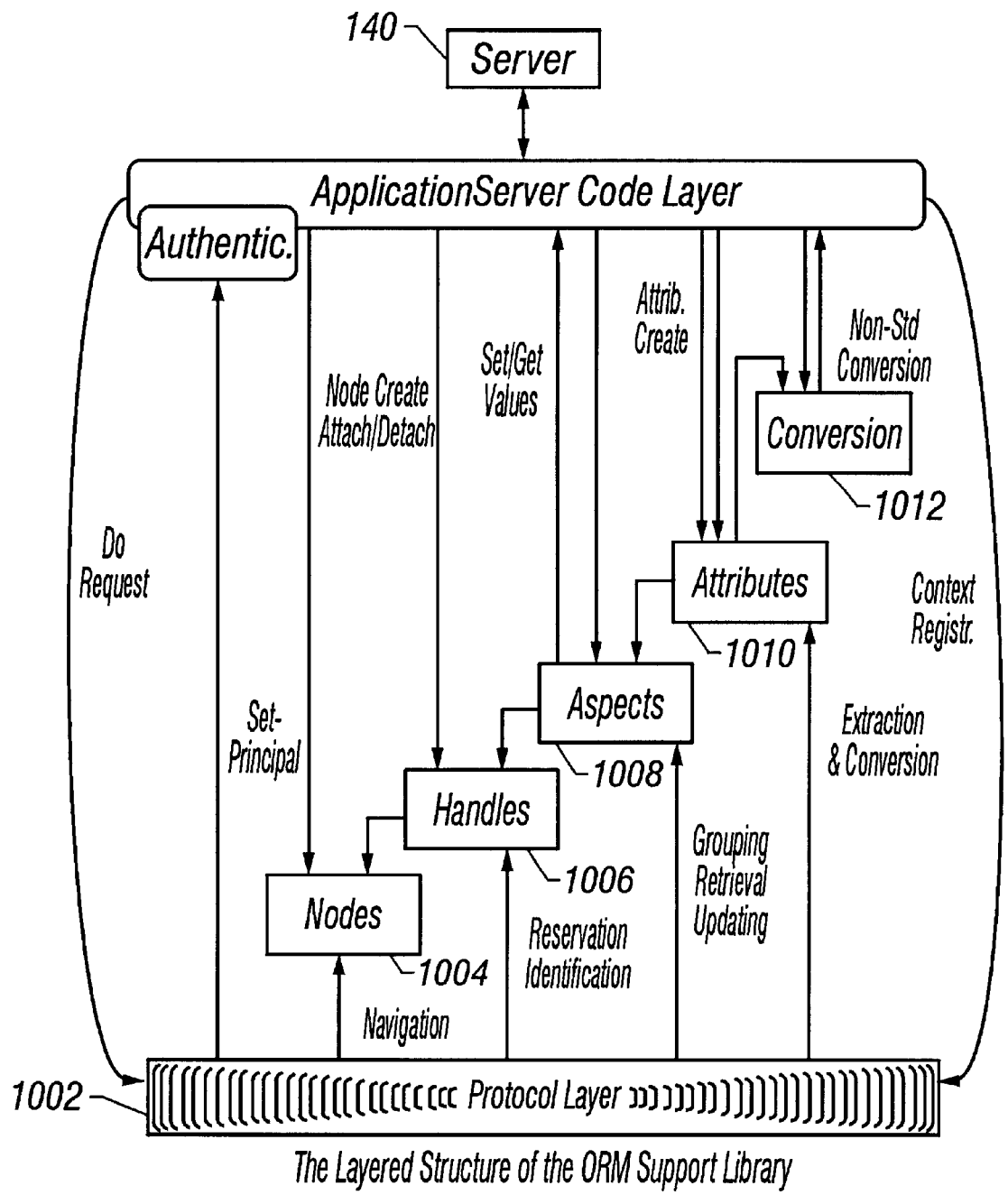
FIG. 10 shows layers of functions available to the object manager.

FIG. 10 shows layers of functions available to the object manager. A Protocol layer 1002 handles the ORM protocol, e.g., decodes the request from server 140, initiates the corresponding functions, and assembles an ORM response. Protocol layer 1002 is the lowest layer and drives all calls to the upper layers by calling "registered" functions. A Node layer 1004 handles navigation between nodes, ie.e, parsing the pathname to locate the virtual node, which represents some management entity.

A Handle layer 1006 maps "virtual nodes" to real objects/data. Such a mapping results in a "handle." Handles are explicitly requested and released. An Aspects layer 1008 handles instances that are made up from more than one ORM tree. For example, the "statistics" Component is not a single Component n the tree, but is generated by the object manager. As another example, some attributes depend on others and cannot be modified independently, but have to be treated as a single, atomic operation. These groups of attributes within an instance are called "aspects" and the corresponding Aspect layer is provided to extract and modify groups of attributes within an instance.

An Attribute layer 1010 retrieves or updates a single attribute (of an aspect) and provides the meta information corresponding to this attribute. A Conversion layer handles the actual conversion of attributes between the external (ORM) and the internal (native) presentation. This layer also converts states and bitmaps to "friendly strings."

2. Web Agents

In another preferred embodiment of the present invention, the objects are not self-describing. In such an embodiment, one or more servers 140 in the system performs a "worm" function, i.e., one or more servers 140 follow object-links between objects and save all the information available concerning those objects. When a request is received from browser 130, server 140 sends its collected data to browser 130 (assuming that the collected data is not older than a threshold age value).

In summary, the present invention allows a user to manage objects by way of hypermedia, such as the world wide web. In a preferred embodiment, the objects are self-describing and respond to questions about themselves from one or more object managers. A server communicates with the object manager(s) and generates HTML from responses received from the object manager. Conventional browser software allows a user to indicate which objects he wishes to browse or change. Using a conventional hypermedia request/response protocol, the browser and server communicate to obtain information about objects and their attributes. The server also translates HTML/URLs received from the browser to requests to the object manager. Such a system allows a non-centralized object management system.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method of using a uniform resource indicator (URI) to retrieve information about a first object, the first object being one of a plurality of objects organized in a directed tree, wherein the directed tree is comprised of a plurality of nodes and a plurality of leaves, each of the plurality of nodes comprised of at least one of an object and a component, each of the plurality of objects corresponding to a node in the plurality of nodes, each of the plurality of leaves comprised of an attribute, the method comprising:

describing the first object with a URI corresponding to a path in the directed tree to a first node corresponding to the first object;

accessing attributes of the first node using a hypertext transfer protocol (HTTP) request for the URI;

receiving a hypertext markup language (HTML) document in response to the request, the HTML document including name and value pairs for each of a first plurality of leaves descended from the first node in the directed tree.

2. The method of claim 1, wherein the accessing further comprises:

translating the HTTP request for the URI into an object request model (ORM) request for the first object;

using a response from the ORM request to add the first plurality of leaves to the plurality of leaves, each of the first plurality of leaves corresponding to an attribute of the first object, each of the attributes comprised of a name and value pair.

3. The method of claim 1, wherein the receiving further comprises including in the HTML document a plurality of URIs, each of the plurality of URIs corresponding to a node in the plurality of nodes descended from the first node in the directed tree.

4. The method of claim 1, wherein the URI includes a server name, a request type, and a plurality of node names separated by delimiters, the plurality of node names each corresponding to a respective node in the plurality of nodes, the plurality of node names arranged to match a path rough the directed tree to the node, the request type at least one of get and set.

5. The method of claim 1, wherein each of the plurality of objects are self-describing objects.

6. The method of claim 1, wherein the HTML document comprises a fill out form to allow attribute values of the first object to be modified.

7. The method of claim 6, further comprising receiving an HTTP request to update attribute values for the first object.

8. The method of claim 1, wherein said URI is a uniform resource locator (URL).

9. A method of using a uniform resource indicator (UR) to retrieve information about a first object, the first object being one of a plurality of objects organized in a directed tree, wherein the directed tree is comprised of a plurality of nodes and a plurality of leaves, each of the plurality of nodes comprised of at least one of an object and a component, each of the plurality of objects corresponding to a node in the plurality of nodes, each of the plurality of leaves comprised of an attribute, the method comprising:

describing the first object with a URI corresponding to a path in the directed tree to a first node corresponding to the first object;

accessing attributes of the first node using a hypertext transfer protocol (HTTP) request for the URI, translating the HTTP request for the URI into an object request model (ORM) request for the first object; and using a response from the ORM request to add the first plurality of leaves to the plurality of leaves, each of the first plurality of leaves corresponding to an attribute of the first object, each of the attributes comprised of a name and value pair; and receiving a hypertext markup language (HTML) document in response to the request, the HTML document including name and value pairs for each of a first plurality of leaves descended from the first node in the directed tree.

10. The method of claim 9, wherein each of the plurality of objects are self-describing objects.

* * * * *

UNITED STATES PATENT AND TRADEMARK OFFICE
CERTIFICATE OF CORRECTION

PATENT NO. : 6,253,254 B1  
DATED : June 26, 2001  
INVENTOR(S) : Ansgar Erlenkoetter; Jeroen Peter de Borst; Peter Douglas Bonham Page 1 of 1

It is certified that error appears in the above-identified patent and that said Letters Patent is hereby corrected as shown below:

Claim 4,
Line 49, delete "rough" and insert in its place -- through --.

Signed and Sealed this

Eighteenth Day of December, 2001

*Attest:*

JAMES E. ROGAN
*Attesting Officer*     *Director of the United States Patent and Trademark Office*